United States Patent
Bol (10) Patent No.: US 6,808,192 B1
(45) Date of Patent: Oct. 26, 2004

(54) TRAILING ARM SUSPENSION (75) Inventor: Stephen J. Bol, Muskegon, MI (US)

(73) Assignee: The Holland Group, Inc., Holland, MI (US)

( * ) Notice: Subject to any disclaimer, the term of this patent is extended or adjusted under 35 U.S.C. 154(b) by 115 days.

(21) Appl. No.: 10/148,098
(22) PCT Filed: Aug. 3, 2000
(86) PCT No.: PCT/US00/21115
  § 371 (c)(1),
  (2), (4) Date: May 23, 2002
(87) PCT Pub. No.: WO01/38113
  PCT Pub. Date: May 31, 2001

Related U.S. Application Data (60) Provisional application No. 60/167,312, filed on Nov. 24, 1999.

(51) Int. Cl.⁷ ................................................. B60G 9/02
(52) U.S. Cl. ............................................. 280/124.116
(58) Field of Search ..................... 280/124.11, 124.116, 280/124.1, 124.128, 676, 681, 687, 86.5

(56) References Cited

U.S. PATENT DOCUMENTS

| | | | |
|---|---|---|---|
| 3,960,388 A | | 6/1976 | Strader et al. |
| 4,293,145 A | * | 10/1981 | Taylor ........................ 280/86.5 |
| 4,309,045 A | | 1/1982 | Raidel |
| 4,693,486 A | * | 9/1987 | Pierce et al. ................ 280/80.1 |
| 5,083,812 A | * | 1/1992 | Wallace et al. ....... 280/124.106 |
| 5,639,110 A | | 6/1997 | Pierce et al. |
| 5,690,353 A | | 11/1997 | Vandenberg |
| 5,718,445 A | | 2/1998 | VanDenberg |
| 5,826,894 A | | 10/1998 | McDonald et al. |
| 5,924,712 A | | 7/1999 | Pierce |

* cited by examiner

Primary Examiner—Faye M. Fleming
(74) Attorney, Agent, or Firm—Price, Heneveld, Cooper, DeWitt & Litton, LLP.

(57) ABSTRACT

A trailing arm suspension (10, 210, 310, 410) comprising a trailing arm (20, 220, 320, 420) having one portion pivotally connected to a frame bracket (22) extending from a vehicle frame (16) and another portion connected to the vehicle frame by an air spring (26) for resisting the rotational forces of the trailing arm. The trailing arm preferably comprises opposing side plates (56, 58) connected by multiple sleeves (94), which are preferably the inner sleeves of bushed connectors (24, 30, 36, 38). Mechanical fasteners (92) extend through the sleeves to compressively mount the side plates to the sleeves to form a rigid beam. An axle adapter (28) and a torque tube adapter (34) are also positioned between the opposing plates. Each of the frame bracket, axle adapter, and torque tube adapter are connected to the trailing arm side plates through a bushed connector to permit the articulation of the trailing arm and whose inner sleeve is used to connect side plates.

17 Claims, 9 Drawing Sheets

TRAILING ARM SUSPENSION

RELATED APPLICATION

This application claims priority on International Application No. PCT/US00/21115, filed Aug. 3, 2000, which claims priority on U.S. Provisional Application No. 60/167,312, filed Nov. 24, 1999.

BACKGROUND OF THE INVENTION

1. Field of the Invention

The invention relates to trailing arm suspensions. In one of its aspects, the invention relates to a trailing arm suspension with a trailing arm having a pair of plates rigidly connected together by clamped spacer tubes. In another of its aspects, the invention relates to a trailing arm suspension with a bolted trailing arm.

2. Description of the Related Art

Trailing arm suspensions are well known and commonly used in heavy-duty vehicles, such as semi tractor-trailer configurations. The trailing arm suspensions can be used for the drive axle of the tractor or the axles of the trailer.

A typical trailing arm suspension comprises a trailing arm having one end pivotally connected to the vehicle frame through a frame bracket and another end connected to the vehicle frame by an air spring. The trailing arm supports an axle to which the vehicle wheels are mounted. Road-induced reaction forces acting on the wheels are controlled by the pivoting of the trailing arm in response to these forces, with the forces being resisted by the air spring.

Given that a typical tractor-trailer has multiple trailing arm suspensions and subject to regulated weight limits, there is a continuous need to reduce the weight and cost of the trailing arm suspensions while maintaining or improving the operating characteristics. Also, the high volume of trailing arm suspensions also exerts continuous pressure for improved and simplified suspension designs to reduce overall costs, including assembly and maintenance costs.

SUMMARY OF THE INVENTION

The invention relates to a trailing arm suspension for supporting a vehicle frame on ground supported wheels wherein a pair of spaced trailing arm assemblies carries an axle, and each of the trailing arm assemblies comprises a trailing arm having one portion adapted to be pivotally mounted to the vehicle frame and a spring for resisting the pivotal movement of the trailing arm relative to the vehicle frame. According to the invention, each trailing arm includes spaced side plates, at least two spacers extending between the spaced slide plates and fasteners extending through the side plates and the at least two spacers clamping the spacers between the side plates to form a rigid beam. Preferably, the spacers are the sole connection between the spaced side plates.

In a preferred embodiment of the invention, the spacers have a tubular body defining an axial passage and opposing ends, with each opposing end abutting one of the side plates, and the fasteners include a bolt which extends through the axial passage and a nut threaded onto the bolt. Preferably, washers are positioned between the spacers and the side plates. At least one of the at least two spacers further comprise a bushing formed by an outer sleeve, an inner sleeve received concentrically within the outer sleeve, and an elastomeric annulus disposed between and bonded to the inner sleeve and the outer sleeve for resilient movement of the inner sleeve with respect to the outer sleeve.

In one embodiment, a torque resistant connector is joined to and extends between the trailing arms to resiliently resist relative rotation of one of the trailing arms with respect to the other. In one embodiment, the torque resistant connector is mounted to the trailing arms through at least one of the at least two spacers. The torque resistant connector is connected to the at least one of the at least two spacers through spaced plates, each of which has an opening in which the torque resistant connector is mounted.

In another embodiment, a base plate spans and is mounted to the side plates of the trailing arm and the torque resistant connector is mounted to the base plate though a resilient coupling. The torque resistant connector is connected to the base plate through spaced plates, each of which has an opening in which the torque resistant connector is mounted, and the resilient coupling comprises a bushing disposed between the base plate and the spaced plates. The resilient coupling further comprises a second bushing on the opposite side of the base plate than the first bushing and a fastener extending through the spaced plates, base plate, and the first and second bushings. A frame bracket is adapted to mount to the frame and pivotally mounts the trailing arm. Alternatively, the torque resistant connector can be mounted to the trailing arm beneath the frame bracket.

In a preferred embodiment of the invention, the axle is connected to the trailing arm through at least one of the at least two spacers. Preferably, the at least one of the two spacers connecting the axle to the trailing arm is a resiliently bushed connector to permit articulation of the trailing arm with respect to the axle. The axle can be mounted to the at least one of the at least two spacers through a wrapper band that compressively mounts the axle to the at least one spacer.

In a preferred embodiment of the invention the spring is an air spring.

Other objects, features, and advantages of the invention will be apparent from the ensuing description in conjunction with the accompanying drawings.

DESCRIPTION OF THE PREFERRED EMBODIMENT

Figure 1:
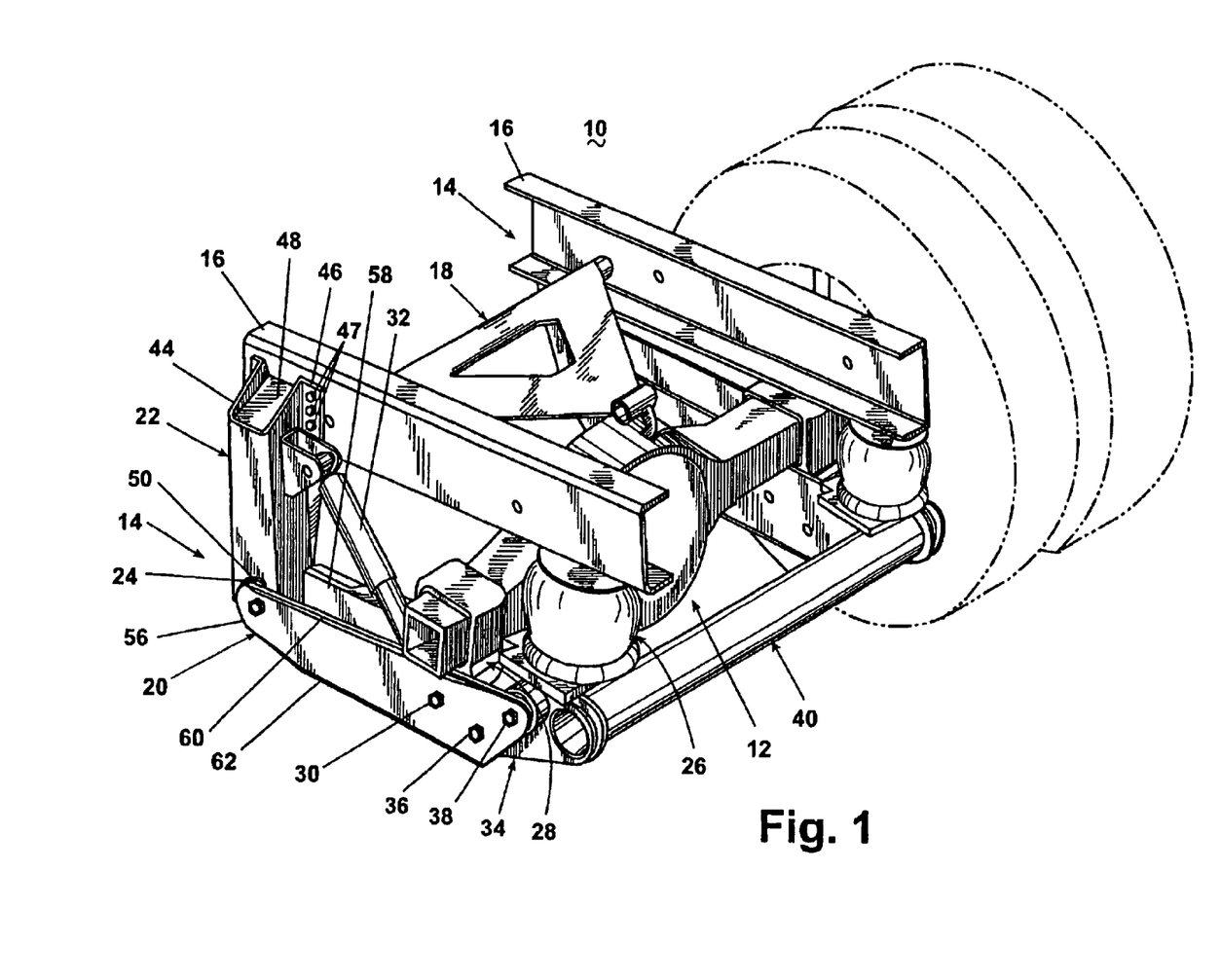
FIG. 1 illustrates a top-rear perspective view of a trailing arm suspension, mounted to a vehicle frame rail and carrying a drive axle, with a trailing arm assembly comprising a bolted beam according to the invention mounted to a portion of a vehicle frame rail and a shock absorber extending between the frame and the trailing arm assembly.

FIG. 1 illustrates a trailing arm suspension 10 for a drive axle 12. The trailing arm suspension comprises a pair of trailing arm assemblies 14 associated with a corresponding vehicle frame rail 16. A lateral force and torque control brace 18 is pivotally mounted to the frame rails 16 and the drive axle 12 to control the lateral movement and acceleration and braking induced input torque of the drive axle 12. Since the trailing arm assemblies 14 are identical, only one of the trailing arm assemblies 14 will be described in detail, with it being understood that the description applies to both trailing arm assemblies 14.

Figure 2:
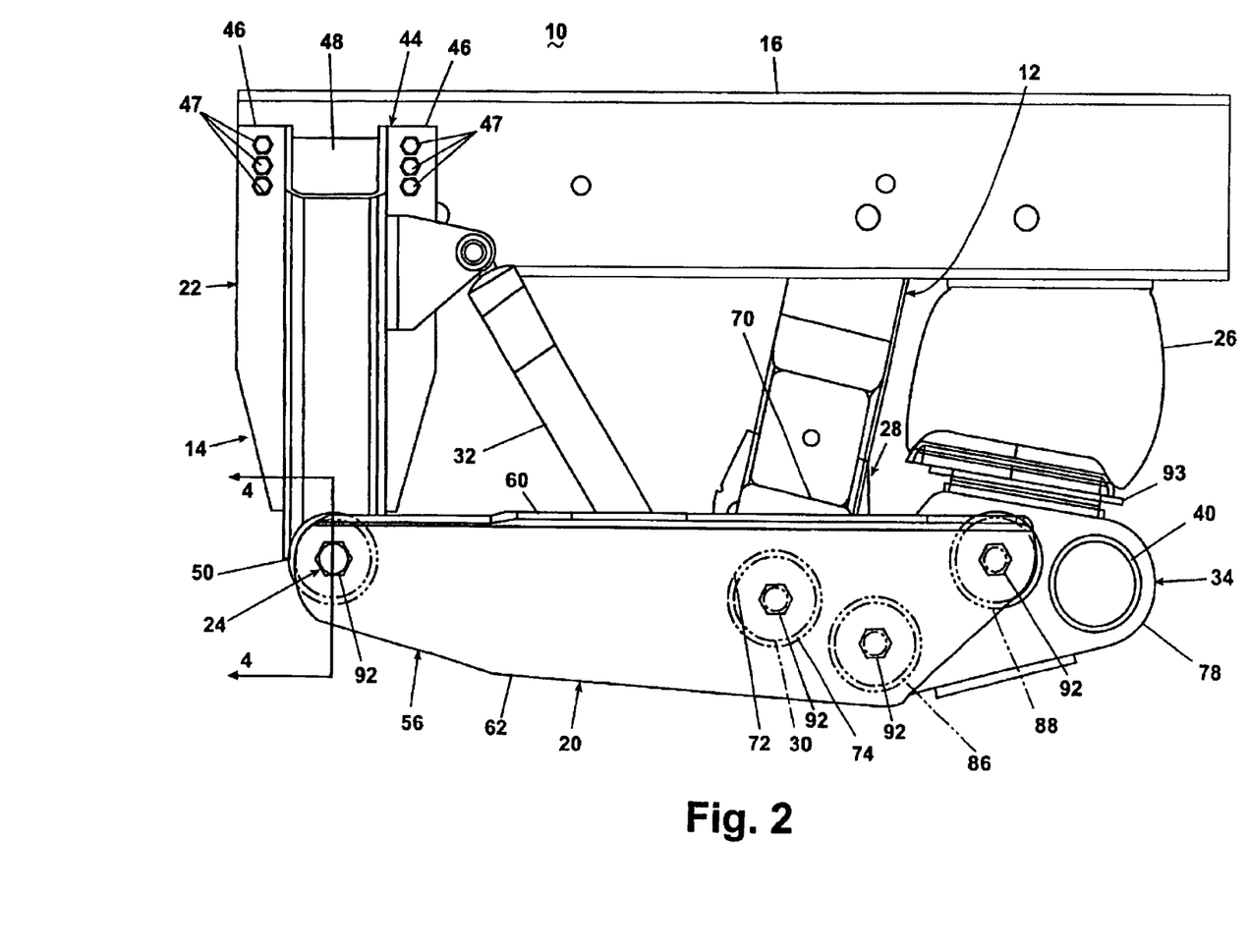
FIG. 2 is a side view of the trailing arm suspension of FIG. 1.
Figure 3:
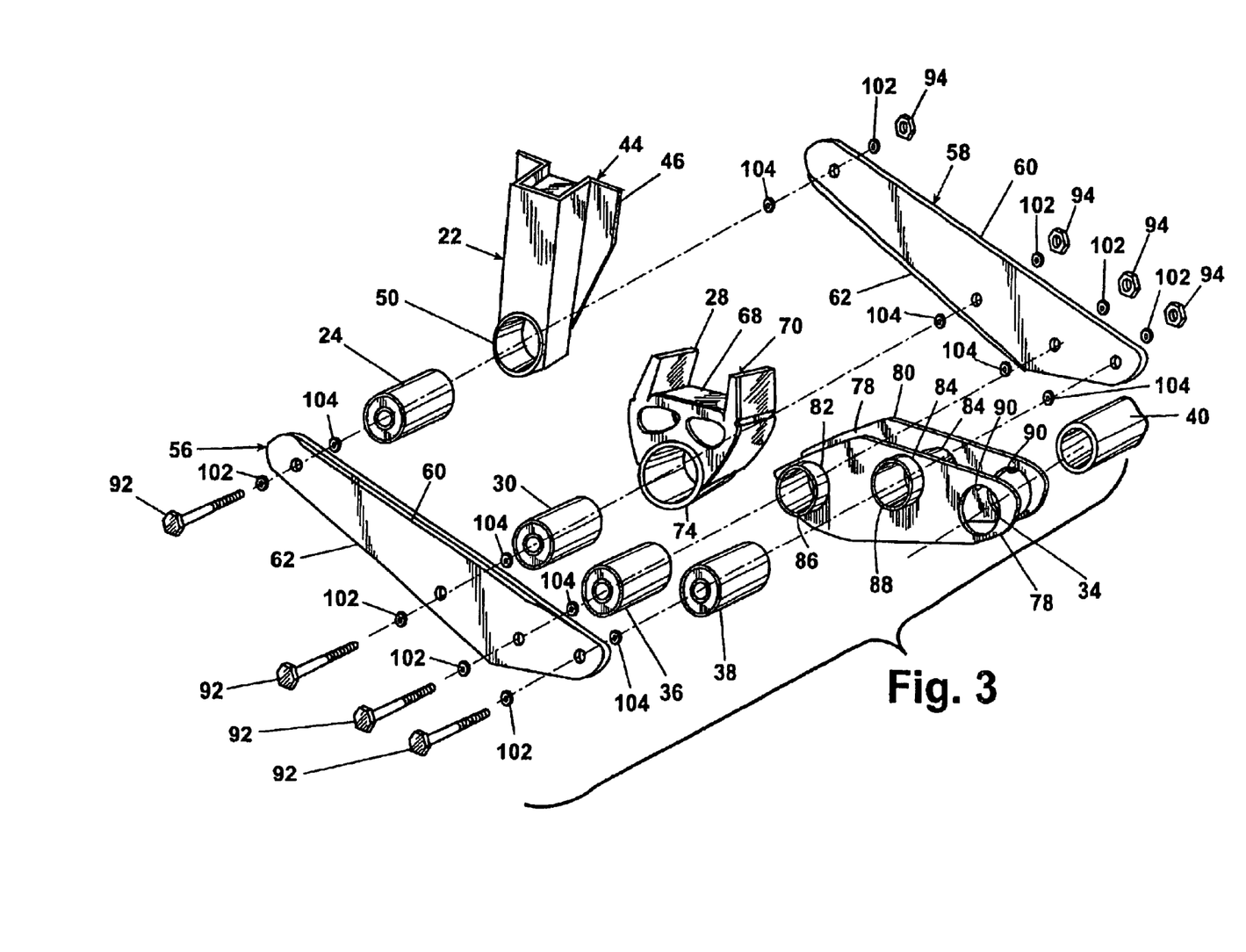
FIG. 3 is an exploded view of the bolted beam illustrated in FIGS. 1 and 2, including a torque tube adapter for mounting a torque tube.

Referring to FIGS. 1–3, the trailing arm assembly 14 comprises a trailing arm 20 having one portion pivotally connected to a frame bracket 22 by a bushing such as bushed connector 24. An air spring 26 is disposed between another portion of the trailing arm 20 and the vehicle frame 16 to resist the rotational movement of the trailing arm 20.

An axle adapter 28 is connected to the trailing arm 20 by an articulating coupling in the form of a bushed connector 30. A shock absorber 32 extends between the axle adapter 28 and the frame bracket 22 to aid in dampening the rotational movement of the trailing arm 20 with respect to the frame bracket 22.

In a manner similar to the axle adapter 28, a torque tube adapter 34 is connected to the trailing arm 20 by an articulating coupling in the form of a pair of bushed connectors 36, 38 and mounts a torque tube 40, which extends between the trailing arm assemblies 14 to resist the vehicle roll-induced torque applied to the trailing arms thereby providing roll stability for the trailing arm suspension 10.

With reference to FIGS. 2 and 3, the various components of the trailing arm suspension 10 are described in greater detail. The frame bracket 22 comprises a U-shaped portion 44 terminating in laterally directed flanges 46 that are bolted to the frame rail 16 through bolts 47. A J-shaped insert 48 is disposed within the U-shaped portion and is welded to the U-shaped portion 44. The lower edge of the U-shaped portion 44 and the J-shaped portion 48 have an arcuate profile that receives a sleeve 50, which is preferably welded thereto. The sleeve 50 is sized to receive the bushed connector 24 in a press-fit relationship. The J-shaped insert 48 increases the bending rigidity of the frame bracket and can be removed if less bending rigidity is required.

The trailing arm 20 comprises a pair of side plates 56, 58. Each of the side plates has an outwardly directed flange 60 along their upper edge and an inwardly directed flange 62 along their lower edge. The flanges 60,62 provide bending strength to the side plates 56, 58.

The axle adapter 28 comprises an axle seat 68 having a U-shaped recess 70 sized to receive the axle housing of the drive axle 12 and an arcuate edge 72 within which is received a sleeve 74, which is preferably welded thereto. The sleeve 74 is sized to slidably receive the bushed connector 30 in a press-fit relationship.

The torque tube adapter comprises a pair of parallel plates 78, 80, each of which have sleeve openings 82, 84 that receive sleeves 86, 88, respectively. The sleeves are preferably welded to the parallel plates 78, 80 at the interface of the sleeves with the plates. The parallel plates 78, 80 further include torque tube openings 90 that are sized to receive the torque tube 40 for a welded connection. An air spring platform 93 is mounted atop the parallel plates 78, 80, forming a base for mounting the lower portion of the air spring 26.

Figure 3A:
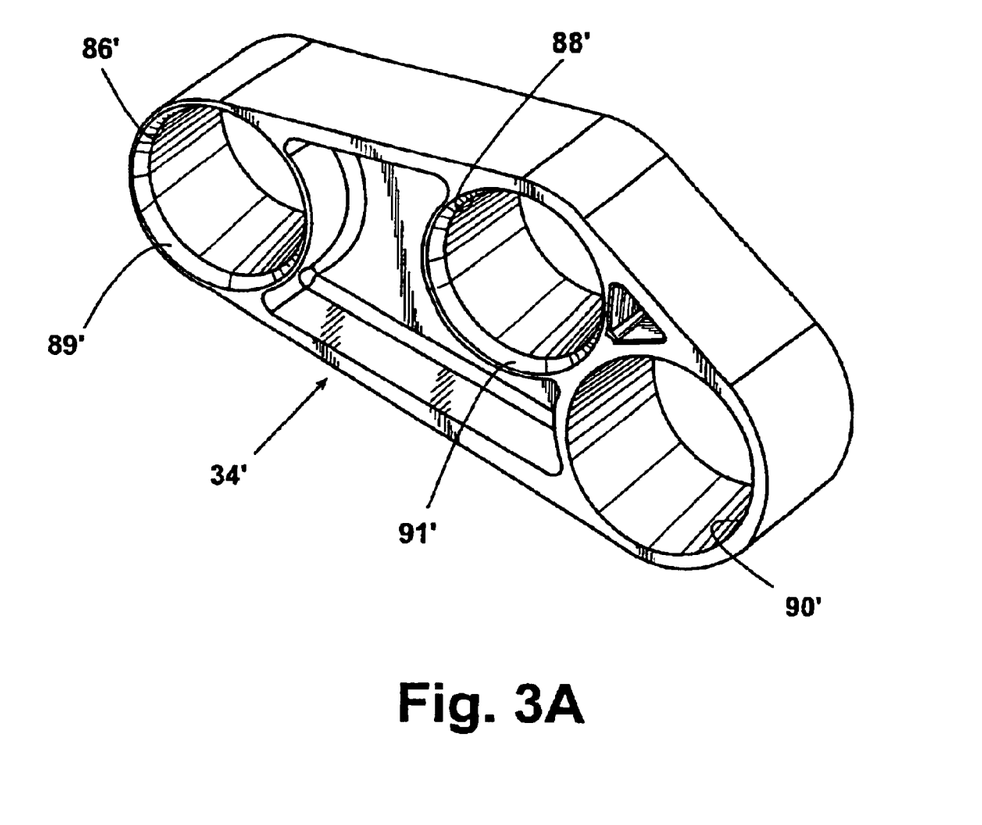
FIG. 3A is an alternative construction of the torque tube adapter.

FIG. 3A illustrates an alternative construction for the torque tube adapter. The alternative torque tube adapter 34' is cast, eliminating the separate side plates and sleeves shown in FIG. 3. The casting has openings 86', 88' that perform the combined function of the sleeves and openings in that the bushed connectors are slidably received with the openings 86', 88'. The openings 86' and 88' preferably include a chamfered edge 89' and 91' to ease the insertion of the bushed connector. An opening 90' receives the torque tube.

Figure 4:
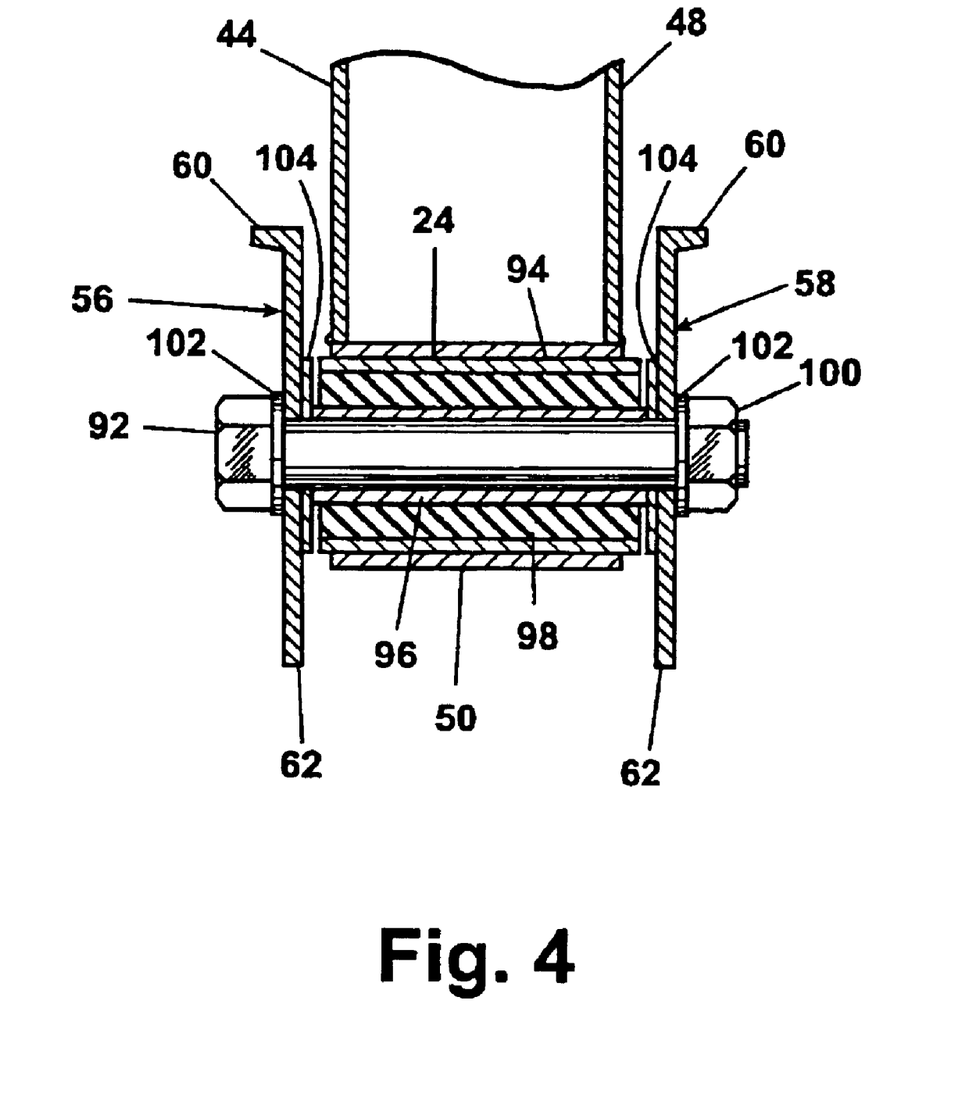
FIG. 4 is a sectional view taken along line 4—4 of FIG. 2.

Referring specifically to FIG. 4, the bushed connector 24 is illustrative of all bushed connectors 30, 36 and 38 and has a tubular inner sleeve 96 and an outer sleeve 94. An elastomeric annulus 98 is disposed between the inner sleeve 96 and the outer sleeve 94. The inner sleeve 96 has an interior opening that is sized to receive a bolt 92, which receives a threaded nut 100. Washers 102 and 104 are disposed between the bolt heads and inner sleeve 96 on opposite sides of the plates 56, 58, respectively. At each of the connections between the side plates 56, 58 and the bushed connectors, the side plates 56, 58 are aligned so that the bolt openings and the side plates are aligned with the interior of the inner sleeve 96. The bolt 92 along with the washers 102, 104 is inserted through the aligned openings in the side plates 56, 58 in the inner sleeve and a nut is threaded onto the end of the bolt along with a washer.

It should be noted that in many applications the bushed connectors will not require the outer sleeve 94 as the sleeve 50 will suffice. In those applications, the elastomeric annulus will directly contact the sleeve 50. Additionally, it should also be noted that a typical elastomeric annulus has multiple lobes forming the outer periphery to ensure contact with the sleeve, while providing a void between the lobes in which the lobes can expand as they are compressed upon insertion into the sleeve.

Other mechanical fasteners or configurations are suitable for mounting the side plates to the inner sleeve. For example, the inner sleeve can be tapped and a bolt threaded into each end of the sleeve. The sleeve could also be shrunk fit within the side plate opening to mechanically fasten the opposing side plates, eliminating the need for the bolt. However, this assembly is not preferred because the use of the bolts is more efficient and less costly. Also, rivets or other suitable fasteners could be used in place of the bolts.

The assembly of the trailing arm 20 is greatly simplified over prior trailing arm structures in that the side plates 56, 58 are compressively retained together by clamping the side plates 56, 58 against the inner sleeves of the bushed connectors 24, 30, 36, and 38 with the bolts 92 and nuts 94. The plates 56, 58 and bushed connectors 24, 30, 36, 38 effectively form the rigid beam when assembled. Upon tightening of the nuts 94, the side plates are compressively retained against the ends of the inner sleeve. A similar connection is made at all of the interfaces between the bushed connectors and the side plates. The multiple points of compressive connection between the side plates 58, 60 and the bushed connectors 24, 30, 36, and 38 result in a unitary and rigid structure.

One advantage of the bolted connection of side plates to the inner sleeves of the bushed connectors is that it avoids the more complex beam structures of prior art trailing arm suspension.

Previous trailing arm suspensions included a beam having a box-like structure welded from various plate structures, including flat plates or U-shaped plates, and then forming openings in the beam in which the bushed connectors were mounted. In these beams bushed connectors were used to couple the axle bracket and similar items to the beam. However, the bushed connectors were connected to the beam by inserting the outer sleeve of the bushed connector within the opening in the beam and welding the outer sleeve to the beam. The bushed connectors nor the inner sleeve of the bushed connectors were used to connect any of the plates to rigidly connect portions of the beam.

The current beam construction is greatly simplified over the prior art construction in that the plates take advantage of the bushed connector inner sleeve construction to form a rigid beam through the compressive connections between the plates and the inner sleeves of the bushed connectors. The rigidity of the beam lies in the beams ability to resist bending both vertically and laterally, while permitting some twisting of the beam about the longitudinal axis of the beam. It is within the scope of the invention for the plates to be connected by the inner sleeves without the additional elements of the bushed connectors.

A second advantage of the invention is that the beam has no stress risers from welding as do previous beam constructions. Therefore, the beam of the invention can operate at higher stress levels, and at lower material requirements.

Figure 5:
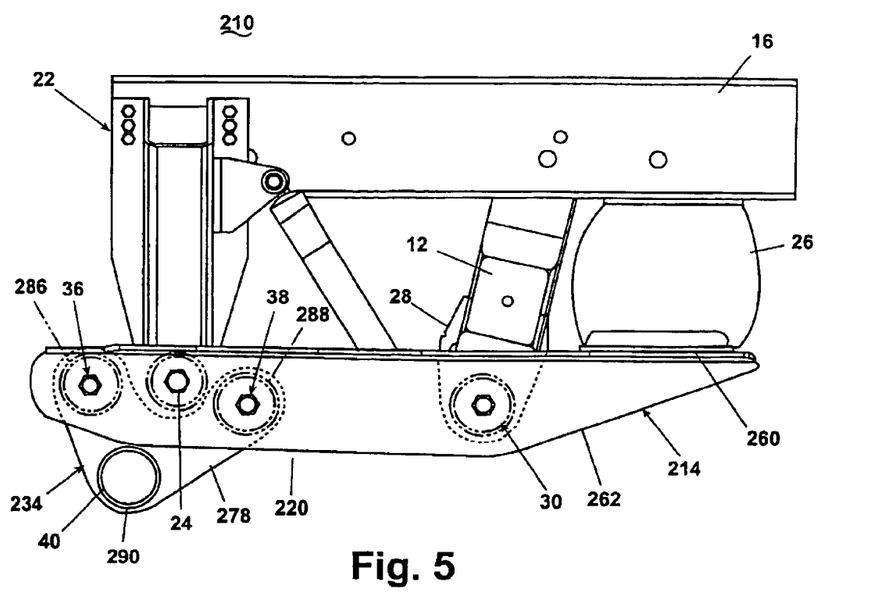
FIG. 5 is a side view of a second embodiment trailing arm suspension with a trailing arm assembly having a bolted beam according the invention.

FIG. 5 illustrates a second embodiment trailing arm suspension 210 having a bolted-beam trailing arm assembly. The main distinction between the second embodiment trailing arm suspension and the first embodiment trailing arm suspension lies in the mounting of the torque beam to the front of the trailing arm, instead of the rear. Therefore, many elements of the second embodiment trailing arm suspension are identical to the first embodiment and like parts will be identified by like numerals.

The second embodiment trailing arm suspension 210 comprises a trailing arm assembly 214 comprising a trailing arm 220 that is rotatably connected to the frame bracket 22 by a bushed connector 24 at a front portion of the trailing arm 220. The air spring 26 connects a rear portion of the trailing arm 220 to the vehicle frame 16. The drive axle 12 is rotatably connected to the trailing arm 220 through axle adapter 28 and bushed connector 30.

Unlike the first embodiment trailing arm assembly 14, the second embodiment trailing arm assembly 214 comprises a torque tube adapter 234 that is mounted at the front portion of the trailing arm 220 instead of the rear portion beneath the air spring 26. The torque tube adapter 234 is connected to the trailing arm by bushed connectors 36, 28 and is shaped to span the frame bracket 22 while having a portion extending beneath the trailing arm 220. The torque beam 40 is mounted to the portion of the torque tube adapter 234 extending beneath the trailing arm 220.

The trailing arm 220 comprises spaced side plates 256, 258, each of which are sized such that the front portion extends beyond the frame bracket 22 when the trailing arm 220 is pivotally mounted to the frame bracket 22. Each of the side plates 256, 258 include an upper flange that is outwardly directed and a lower flange 262 that is inwardly directed. The upper and lower flanges 260, 262 provide each plate with a cross sectional area that more greatly resists bending along the longitudinal axis of the side plates 256, 258. The opposing directions of the upper and lower flange 260, 262 effectively provide each plate with a Z-shaped cross section. The flanges can be oriented to provide the side plates 256, 258 with other suitable cross sections, such as C-shaped, I-shaped and J-shaped, for example.

Figure 6:
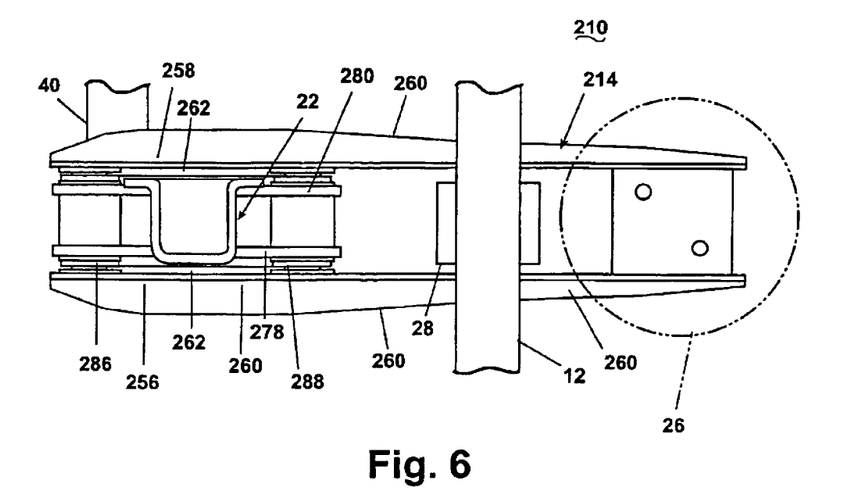
FIG. 6 is a top view of the second embodiment trailing arm suspension according to the invention with the vehicle frame rail and shock absorber removed for clarity.

The torque tube adapter 234 is similar in construction to the torque tube adapter 34 in that it composes opposing plates 278, 280 in which are formed sleeve openings 282, 284 that receive sleeves 286, 288. Unlike the first embodiment, the sleeve openings 282, 284 are positioned on opposition ends of the triangular plates 278, 280. A torque tube opening 290 is disposed between the sleeve openings 282, 284 near the apex of the triangular cross section. The sleeves 286, 288 receive the bushed connectors 38, 38 in the same manner as described with respect to the first embodiment. Similarly, the torque tube openings 290 receive the torque tube 40 in the same manner as described in the first embodiment.

The trailing arm 220 is assembled in the same manner as the first embodiment. That is the side plates 256, 258 are rigidly connected by the inner sleeves of the bushed connectors 24, 30, 36, and 38 in the manner described relative to FIG. 4.

Figure 7:
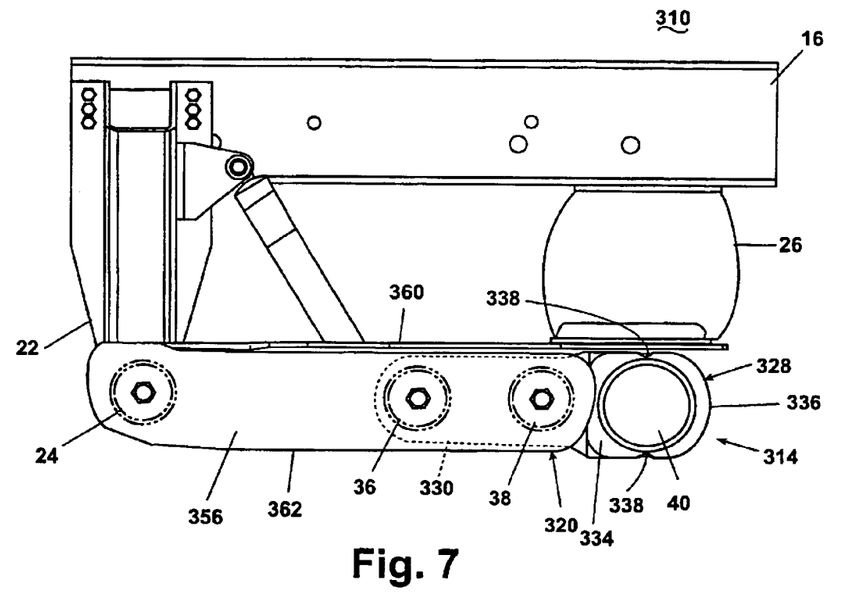
FIG. 7 is a side view of a third embodiment trailing arm suspension carrying a non-drive axle, with a trailing arm assembly including a bolted beam according to the invention in combination with a squeeze joint for coupling the axle to the trailing arm.
Figure 8:
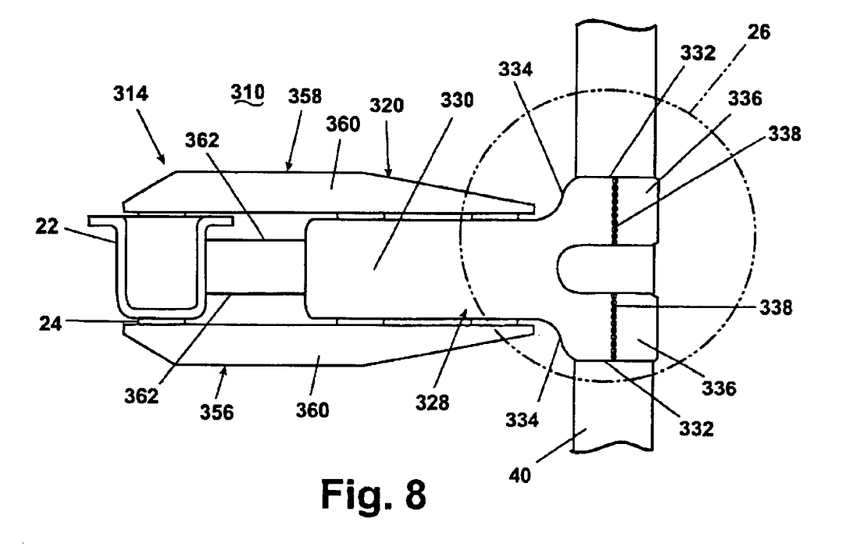
FIG. 8 is a top view of the third embodiment trailing arm suspension of FIG. 7 with the vehicle frame rail and shock absorber removed for clarity.

FIGS. 7 and 8 illustrate a third embodiment trailing arm suspension 310 according to the invention. The third embodiment trailing arm suspension comprises several elements that are essentially identical to the first and second embodiments. Therefore, like parts will be identified by like numerals.

The main difference between the third embodiment trailing arm suspension 310 and the first and second embodiments 10, 210, lies in that the axle is connected to the trailing arm through a squeeze joint that applies a compressive force about the axle without requiring direct welding of the axle to the trailing arm or an intervening bracket. The third embodiment trailing arm suspension is ideally suited for a trailer suspension instead of a drive axle suspension as illustrated in the first and second embodiments.

The trailing arm suspension 310 comprises a pair of trailing arm assemblies 314, each comprising a trailing arm 320 having a forward end pivotally mounted to the frame bracket 22 by a bushed connector 24 and a rearward portion connected to the vehicle frame rail 16 by an air spring 26.

An axle adapter 328 mounts the axle 40 by using a compressed wrapper band 330. Suspension systems with compressed wrapper bands are disclosed in PCT published application WO 97/06022. Preferably, the axle adapter 328 is a casting having a Y-shape as best seen in FIG. 8. The Y-shape defines an arm 330 terminating in finger-like spaced wrapper bands 332 that circumscribe the axle 40. The wrapper bands 332 comprise a semi-circular seat 334 that is integrally formed with the arm 330 and a semi-circular wrapper plate 336 whose ends are welded at 338 to the bands 334. The arm 330 includes sleeve openings 383, 384 in which are slidably received sleeves 386, 388 that receive bushed connectors 36, 38 for mounting the axle adapter 328 to the trailing arm 320. The shape of the wrapper bands are not limited to a circle, but preferably conform to the shape of the axle.

The trailing arm 320 comprises spaced side plates 356, 358, each of which have an upper flange 360 and a lower flange 362 that are both outwardly directed. The side plates 356, 358 are assembled into the trailing arm 320 through the inner sleeves of the bushed connectors 24, 36, and 38 in the same manner as described with respect to the first and second embodiments.

As with the first and second embodiments, the axle adapter 328 is free to pivot or rotate about the longitudinal axis of the bushed connector 24 enabling the trailing arm to rotate in response to discontinuities in the road surface. Additionally, the trailing arm 320 can rock along the longitudinal axis of the bushed connector 24 to relieve the bending moments applied to the axle 40 generated by the relative movement of the trailing arm 320 of the spaced trailing arm assemblies 314. The ability of the trailing arm 320 to relieve the bending moments applied to the axle 40 is especially important when the axle is rigidly connected to the axle adapter as is the case with the squeeze joint.

Figure 9:
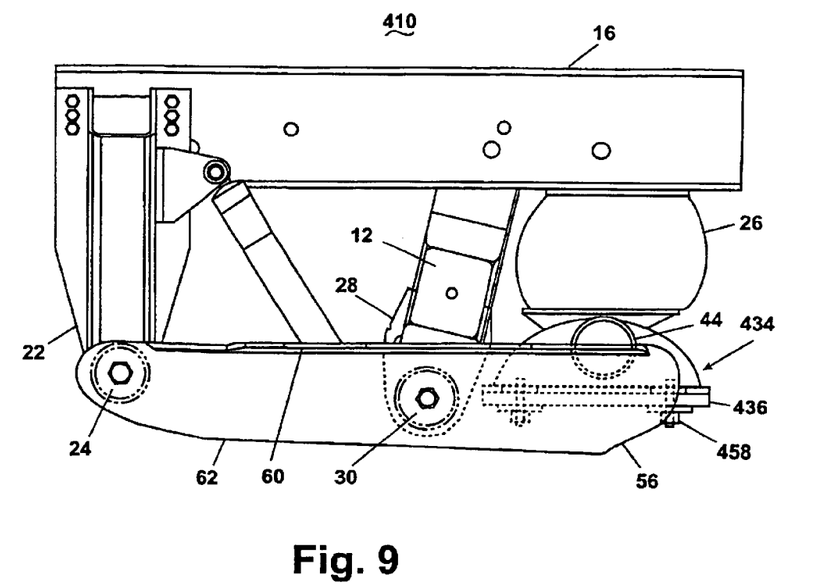
FIG. 9 is a side view of a fourth embodiment trailing arm suspension according to the invention incorporating elastomeric disk bushings instead of bushed connectors to connect a torque tube to the trailing arm.
Figure 10:
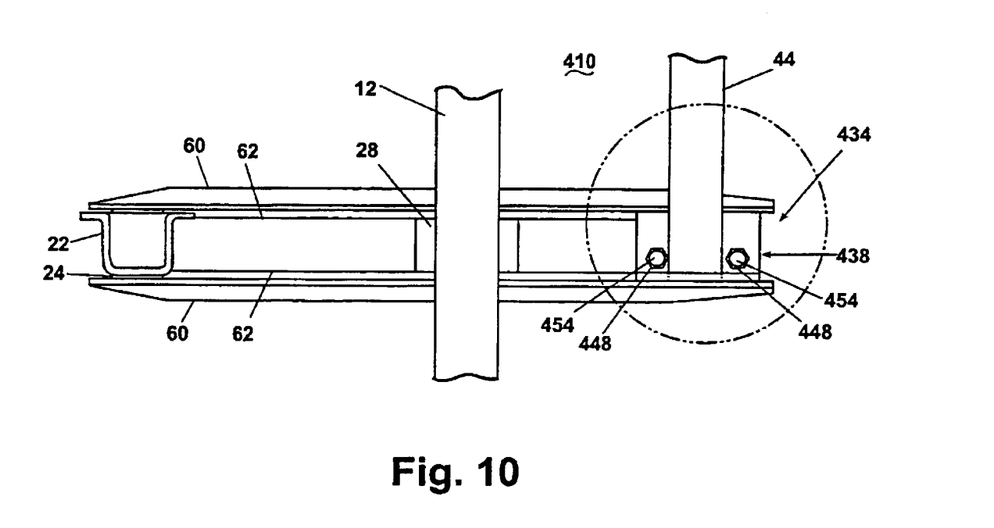
FIG. 10 is a top view of the fourth embodiment trailing arm suspension of FIG. 9 with the frame rail and shock absorber removed for clarity.
Figure 11:
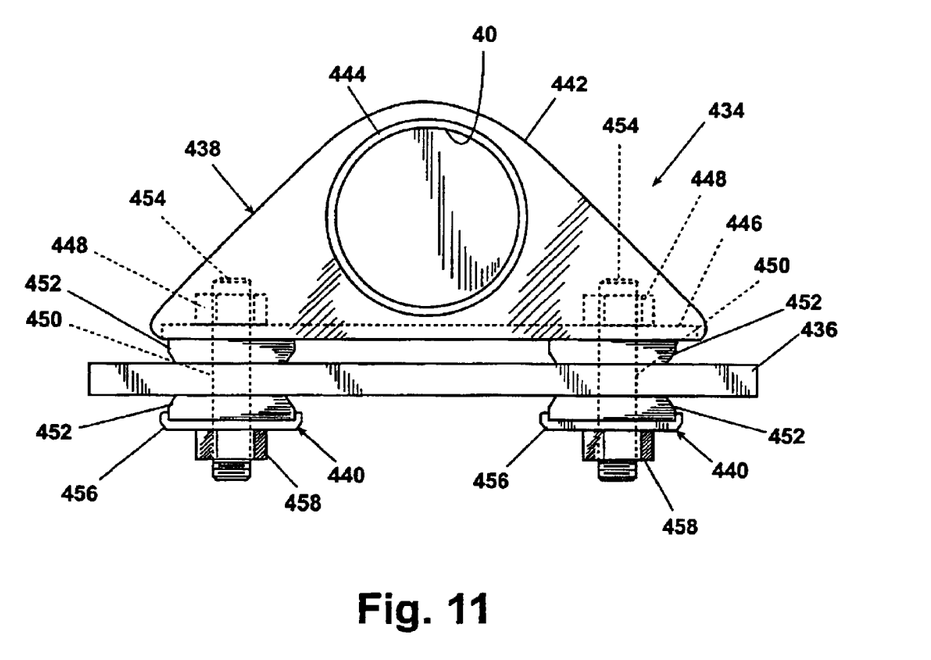
FIG. 11 is an enlarged partial sectional view of FIG. 9 illustrating the mounting of the torque tube to the trailing arm.

FIGS. 9 through 11 illustrate a fourth embodiment trailing arm suspension 410 according to the invention. Some elements of the fourth embodiment trailing arm suspension are identical to the first embodiment trailing arm suspension 10. Therefore, like numerals will be used to identify like parts.

The fourth embodiment trailing arm suspension 410 is substantially identical to the first embodiment trailing arm suspension except that the torque tube adapter 34 is replaced with an alternative torque tube adapter 434. The alternative torque tube adapter 434 comprises a base plate 436 that spans the side plates 56, 58. The base plate 436 can be assembled to the side plates 56, 58 in a variety of ways. For example, the base plate 436 can be welded to the interior of the side plates 56, 58. Alternatively, the base plate 436 can have fingers that are received in slots formed in the sides of the side plates 56, 58. The base plate 436 mount tube plate 438 through an articulating coupling in the form of bushed washer assemblies 440, which permit the articulation of the tube plate 438 relative to the base plate 436.

The tube plate 438 comprises a triangular side wall 442 in which is formed a torque tube opening 444 receiving the torque tube 40. A washer plate 446 extends substantially perpendicular to the torque tube plate 442 and has openings 448 that align with openings 450 in the base plate 436 when the torque tube adapter 434 is completely assembled.

The bushed washer assemblies 440 comprise elastomeric disk shaped bushings 452, preferably having an annular cross section defining an axial opening, that are positioned above and below the base plate 436 such that the bushing axial openings are aligned with the openings 448, 450. A bolt 454 passes through the openings 448, 450 and the bushing axial opening. A washer 456 is received on the bolt 454 and abuts the lower bushing 452. A nut 458 is threaded onto the bolt 452 and is tightened to compress the bushings 452 between the washer 456, base plate 436 and washer plate 446.

Preferably, the bushings 452 are made from rubber or urethane. The annular bushings 452 are sufficiently resilient or compressible to permit relative articulation between the tube plate 438 and the base plate 436. Since the tube plates 438 rigidly mount the torque rod 40 the annular bushing 452 effectively permits articulation of the torque tube 40 relative to the trailing arm 20.

Whereas the embodiment of FIGS. 9–11 has been shown with two separate bushings 452, the bushings 452 can be integrated into a single bushing disposed between the base plate and the tube plate.

While the invention has been specifically described in connection with certain specific embodiments thereof, it is to be understood that this is by way of illustration and not of limitation, and the scope of the appended claims should be construed as broadly as the prior art will permit.

What is claimed is:

1. A trailing arm suspension for supporting a vehicle frame above a foundation, the trailing arm suspension comprising a pair of spaced trailing arm assemblies and an axle carried by the trailing arm assemblies, each of the trailing arm assemblies comprising, a trailing arm having one portion adapted to pivotally mount to the vehicle frame and a spring for resisting the pivotal movement of the trailing arm relative to the vehicle frame, characterized by:

each trailing arm comprising spaced side plates and at least two spacers extending between the spaced side plates; and fasteners extending through the side plates and the at least two spacers clamping the spacers between the side plates to form a rigid beam.

2. The trailing arm suspension according to claim 1 wherein the spacers are the sole connection between the spaced side plates.

3. The trailing arm suspension according to claim 1 wherein the spacers have a tubular body defining an axial passage and opposing ends, with each opposing end abutting one of the side plates, and the fasteners include a bolt which extends through the axial passage and a nut threaded onto the bolt.

4. The trailing arm suspension according to claim 1 and further comprising washers positioned between the spacers and the side plates.

5. The trailing arm suspension according to claim 1 wherein at least one of the at least two spacers further comprise a bushed connector formed by an outer sleeve, an inner sleeve received concentrically within the outer sleeve, and an elastomeric annulus disposed between and bonded to the inner sleeve for resilient movement of the inner sleeve with respect to the outer sleeve.

6. The trailing arm suspension according to claim 1 and further comprising a torque resistant connector joined to and extending between the trailing arms to resiliently resist relative rotation of one of the trailing arms with respect to the other.

7. The trailing arm suspension according to claim 6 wherein the torque resistant connector is mounted to the trailing arms through at least one of the at least two spacers.

8. The trailing arm suspension according to claim 7 wherein the torque resistant connector is connected to the at least one of the at least two spacers through spaced plates, each of which has an opening in which the torque resistant connector is mounted.

9. The trailing arm suspension according to claim 6 and further comprises a base plate spanning and mounted to the side plates and the torque resistant connector is mounted to the base plate through a resilient coupling.

10. The trailing arm suspension according to claim 9 wherein the torque resistant connector is connected to the base plate through spaced plates, each of which has an opening in which the torque resistant connector is mounted, and the resilient coupling comprises a bushing disposed between the base plate and the spaced plates.

11. The trailing arm suspension according to claim 10 wherein the resilient coupling further comprises a second bushing on the opposite side of the base plate than the first bushing and a mechanical fastener extending through the spaced plates, base plate, and the first and second bushings.

12. The trailing arm suspension according to claim 6 wherein the trailing arm assembly further comprises a frame bracket adapted to mount to the frame and pivotally mounting the trailing arm and wherein the torque resistant connector is mounted to the trailing arm beneath the frame bracket.

13. The trailing arm suspension according to claim 1 wherein the axle is connected to the trailing arm through at least one of the at least two spacers.

14. The trailing arm suspension according to claim 13 wherein the at least one of the two spacers connecting the axle to the trailing arm is a resiliently bushed connector to permit articulation of the trailing arm with respect to the axle.

15. The trailing arm suspension according to claim 14 wherein the axle is mounted to the at least one of the at least two spacers through a wrapper band that compressively mounts the axle to the at least one spacer.

16. The trailing arm suspension according to claim 1 wherein the spring is an air spring.

17. The trailing arm suspension according to claim 13 wherein the axle is mounted to the at least one of the at least two spacers through a wrapper band that compressively mounts the axle to the at least one space.

* * * * *

UNITED STATES PATENT AND TRADEMARK OFFICE
CERTIFICATE OF CORRECTION

PATENT NO. : 6,808,192 B1
DATED : October 26, 2004
INVENTOR(S) : Stephen J. Bol

It is certified that error appears in the above-identified patent and that said Letters Patent is hereby corrected as shown below:

Title page,
Item [57], ABSTRACT,
Line 18, after "connect" insert -- the --.

Column 1,
Line 52, "slide" should be -- side --.

Column 2,
Line 59, after "according" insert -- to --.

Column 3,
Lines 63 and 64, "their" should be -- its --.

Column 5,
Line 20, before "the" (1st occurrence) insert -- Neither --.

Column 6,
Line 6, "cross sectional" should be -- cross-sectional --.
Line 21, "bushed connectors 38, 38" should be -- bushed connectors 36, 38 --.

Column 10,
Line 10, "space" should be -- spacer --.

Signed and Sealed this

Eighth Day of March, 2005

JON W. DUDAS
*Director of the United States Patent and Trademark Office*